(12) United States Patent
Fay et al.

(10) Patent No.: US 12,081,831 B2
(45) Date of Patent: Sep. 3, 2024

(54) DIGITAL SIGNAGE USING ATSC 3.0

(71) Applicant: SONY CORPORATION, Tokyo (JP)

(72) Inventors: Luke Fay, San Diego, CA (US); Adam Goldberg, Fairfax, VA (US); Graham Clift, Poway, CA (US)

(73) Assignee: SONY CORPORATION, Tokyo (JP)

( * ) Notice: Subject to any disclaimer, the term of this patent is extended or adjusted under 35 U.S.C. 154(b) by 422 days.

(21) Appl. No.: 16/952,581

(22) Filed: Nov. 19, 2020

(65) Prior Publication Data

US 2022/0124401 A1    Apr. 21, 2022

Related U.S. Application Data

(60) Provisional application No. 63/094,828, filed on Oct. 21, 2020.

(51) Int. Cl.
H04N 21/438    (2011.01)

(52) U.S. Cl.
CPC ................. H04N 21/438 (2013.01)

(58) Field of Classification Search
None
See application file for complete search history.

(56) References Cited

U.S. PATENT DOCUMENTS

2002/0116717 A1*  8/2002  Eller ....................... G09F 27/00
                                                                725/147
2020/0145728 A1*  5/2020  Kamela .............. H04N 21/8455

OTHER PUBLICATIONS

Advanced Television Systems Committee, "ATSC Candidate Standard Revision: Signaling, Delivery, Synchronization and Error Protection", Jan. 22, 2019, Doc. S33-1-951r14. (Year: 2019).*
"RFC 4033, DNS Security Introduction and Requirements," Arends, R., Austein, R., Larson, M., Massey, D., and S. Rose, Internet Engineering Task Force, Fremont, CA, Mar. 2005.
"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Recommended Practice: Techniques for Signaling, Delivery and Synchronization (A/351)", Aug. 28, 2019.
"ATSC Standard: ATSC 3.0 Interactive Content (A/344)", May 2, 2019.
"ATSC Standard: ATSC 3.0 Security and Service Protection (A/360)", Aug. 20, 2019.
"ATSC Standard: ATSC 3.0 System (A/300)", May 15, 2020.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.

(Continued)

*Primary Examiner* — Omar S Parra
(74) *Attorney, Agent, or Firm* — John L. Rogitz; John M. Rogitz

(57) ABSTRACT

Techniques are described for using the Advanced Television Systems Committee (ATSC) 3.0 television protocol and more specifically various types of ATSC 3.0 signaling to deliver private content for signage to kiosks and other public displays.

13 Claims, 6 Drawing Sheets

(56) References Cited

OTHER PUBLICATIONS

"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (Gcm)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.

* cited by examiner

| Element or Attribute Name | Use | Data Type | Short Description |
|---|---|---|---|
| PUT 601 | | | Root element of the PUT. |
| @UserDefinedSubtype 602 | 1 | String | Identifies that this UserDefined LLS table is a PUT. |
| @bsid 604 | 1 | slt:listOfUnsignedShort | Identifies the one or more Broadcast Streams comprising the Services. |
| PUTCapabilities 606 | 0..1 | slt:CapabilitiesType | Required capabilities for decoding and meaningfully presenting the content for all the Services in this PUT instance. |
| Service 608 | 1..N | | Service information. |
|   @serviceId 610 | 1 | unsignedShort | Integer number that identifies this Service within the scope of this Broadcast area. |
|   @globalServiceID 612 | 0..1 | anyURI | A globally unique URI that identifies the ATSC 3.0 Service. |
|   @putSvcSeqNum 614 | 1 | unsignedByte | Version of PUT Service info for this Service |
|   @putStartTime 616 | 1 | dateTime | Signals the start time of the Service |
|   @putStopTime 618 | 1 | dateTime | Signals the stop time of the Service. |
|   @protected 620 | 0..1 | boolean | Indicates whether one or more components needed for meaningful presentation of this Service are protected (e.g. encrypted). |
|   @majorChannelNo 622 | 0..1 | unsignedShort 1..999 | Major channel number of the Service. |
|   @minorChannelNo 624 | 0..1 | unsignedShort 1..999 | Minor channel number of the Service. |
|   @deviceType 626 | 1 | unsignedByte | Device Type, coded per Table 6.4 |
|   @deviceId 628 | 1 | unsignedByte | Device Identification number to deliver separate content to different device locations. |
|   @shortServiceName 630 | 0..1 | string | Short name of the Service. |
|   @hidden 632 | 0..1 | boolean | Indicates whether the Service is intended for testing or proprietary use, and is not to be selected by ordinary TV receivers. |
|   @drmSystemID 634 | 0..1 | anyURI | For @serviceCategory=6 (DRM Data Service), specifies the DRM System ID of a specific DRM system delivered as part of this Service. |
|   SvcCapabilities 636 | 0..1 | sa:CapabilitiesType | Required capabilities for decoding and meaningfully presenting content of this Service. |
|   BroadcastSvcSignaling 638 | 0..1 | | Location, protocol, address, id information for broadcast signaling. |
|     @putProtocol 640 | 1 | unsignedByte | Protocol used to deliver the Private Usage for this Service. |
|     @putMajorProtocolVersion 642 | 0..1 | unsignedByte | Major version number of protocol used to deliver Private Usage for this Service. |
|     @putMinorProtocolVersion 644 | 0..1 | unsignedByte | Minor version number of protocol used to deliver Private Usage for this Service. |
|     @putDestinationIpAddress 646 | 1 | IPv4address | A string containing the dotted-IPv4 destination address of the packets carrying broadcast Private Usage data for this Service. |
|     @putDestinationUdpPort 648 | 1 | unsignedShort | Port number of the packets carrying broadcast Private Usage data for this Service. |
|     @putSourceIpAddress 650 | 0..1 | IPv4address | A string containing the dotted-IPv4 source address of the packets carrying broadcast Private Usage data for this Service. |

FIG. 6

DIGITAL SIGNAGE USING ATSC 3.0

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including, but not limited to, televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, broadcasting in ATSC 3.0 multicasts data from one source to many receivers. ATSC 3.0 allows for User Defined tables in the Low Level Signaling starting point of Service Discovery (A/331 Standard) which are entirely user specific. This allows anyone to define a form on how that private data is structured, and moreover a structure for signaling to discern between device types or specific devices of the same device type. Present principles provide that structure for private usage data in an extensible markup language (XML) document. This allows easy fast adoption of private user data and fast upgrades to signaling as needed. The XML syntax and semantics are defined herein apply to many different use cases to allow broadcasters to enable private business advertisements to many different devices located across an entire market. The XML document, referred to herein as a Private Usage Table (PUT), allows multicast streams to be customized to a variety of devices types and/or a number of those device types.

Present principles may be used in unicast distribution platforms as well (internet). Small distribution systems inside organizations can use this to target hallway screens or food menus, etc. It allows private data to be multicast to several devices (TVs) that support ATSC 3.0 signaling.

Accordingly, a digital television transmitter assembly includes at least one processor programmed with instructions to send to at least one display information to be presented using at least one digital television signaling. To send private data, the signaling may include one or more of:

a service list table (SLT)@serviceCategory=1 "Linear A/V Service" with @hidden="true";

SLT @serviceCategory=3 "App-based Service" with @hidden="true", accompanied by an hypertext markup language (HTML)5 application for digital signage;

HTML entry pages location description (HELD) message with AppContextId, with non-real time (NRT) files of pictures being sent;

a @serviceCategory 7="Video Only Service", with an extended file delivery table (EFDT) that indicates files for pictures; and.

a low level signaling (LLS)_table_id=0xFF, "User-defined usage" with user service bundle description (USBD) and Service-based Transport Session Instance Description (S-TSID) maintained and an extensible markup language (XML) document defined with namespace for @deviceType indicating a type of device that the display is.

In the last of the above techniques, the signaling can include a private usage table (PUT) with data elements identifying at least one broadcast stream, capabilities for decoding and meaningfully presenting the display information, and a service associated with the display information. The PUT may further include at least one data element identifying a start time of the service, an end time of the service, and a channel number of the service. Furthermore, the example PUT may include at least one data element identifying an identification number of at least one receiver for presenting the display information, capabilities for decoding and presenting the digital information, and a delivery protocol associated with the service.

In example embodiments, the digital television signaling includes advanced television systems committee (ATSC) 3.0 signaling.

In another aspect, a digital television receiver assembly includes at least one display for presenting digital signage, and at least one processor configured with instructions for controlling the display to present the digital signage in accordance with at least one private usage table (PUT).

The PUT may be indicated by a low level signaling (LLS)_table_id=0xFF.

The digital television receiver assembly may include at least one universal serial bus (USB) dongle with an Advanced Television Systems Committee (ATSC) 3.0 receiver. The digital television may also be a NEXTGEN TV that includes an ATSC 3.0 receiver and only needs to respond to PUT signaling.

The display can be a consumer display. Or, the display can be a public display.

In another aspect, a method includes receiving digital television signaling comprising at least one private usage table (PUT), and presenting digital sign information in a time period defined by the PUT and in accordance with signaling parameters in the PUT.

The details of the present application, both as to its structure and operation, can best be understood in reference to the accompanying drawings, in which like reference numerals refer to like parts, and in which:

BRIEF DESCRIPTION OF THE DRAWINGS

FIG. 6 illustrates an example private usage table (PUT); and

DETAILED DESCRIPTION

Figure 1:
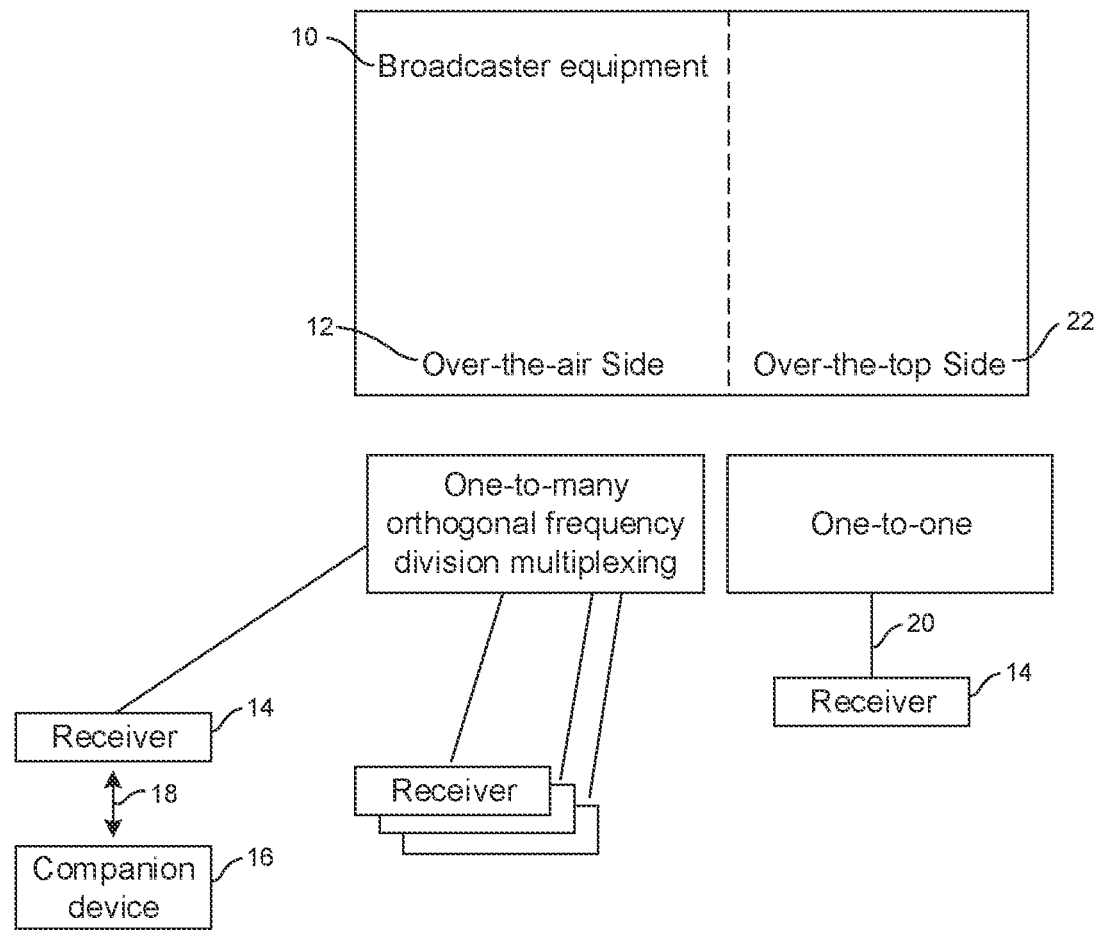
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
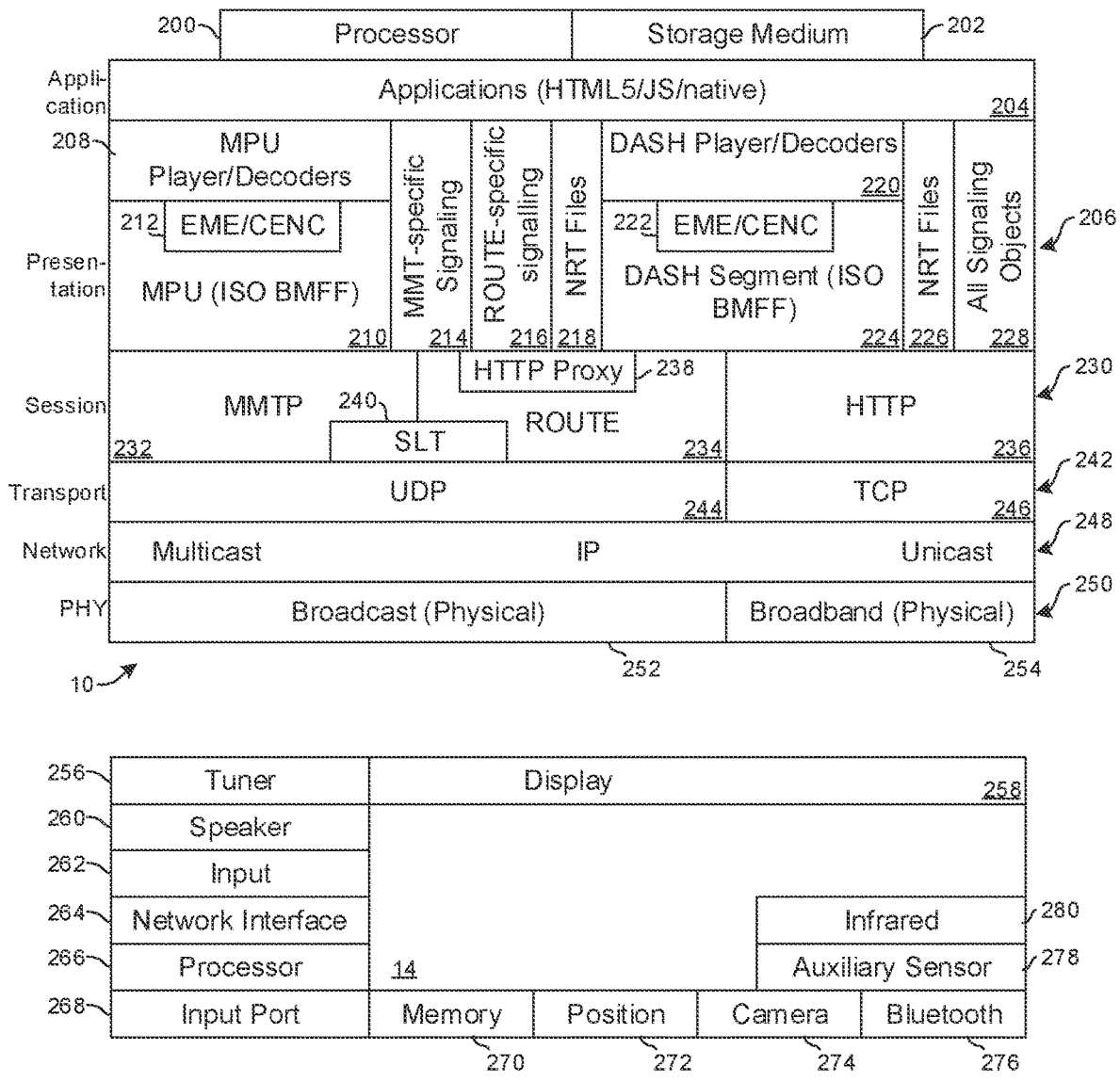
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements. Audio video (AV) streams are contained in ROUTE sessions. Layered coding transport (LCT) channels are setup within a ROUTE session. Each LCT channel carries either video or audio or captions or other data.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/ microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

Figure 3:
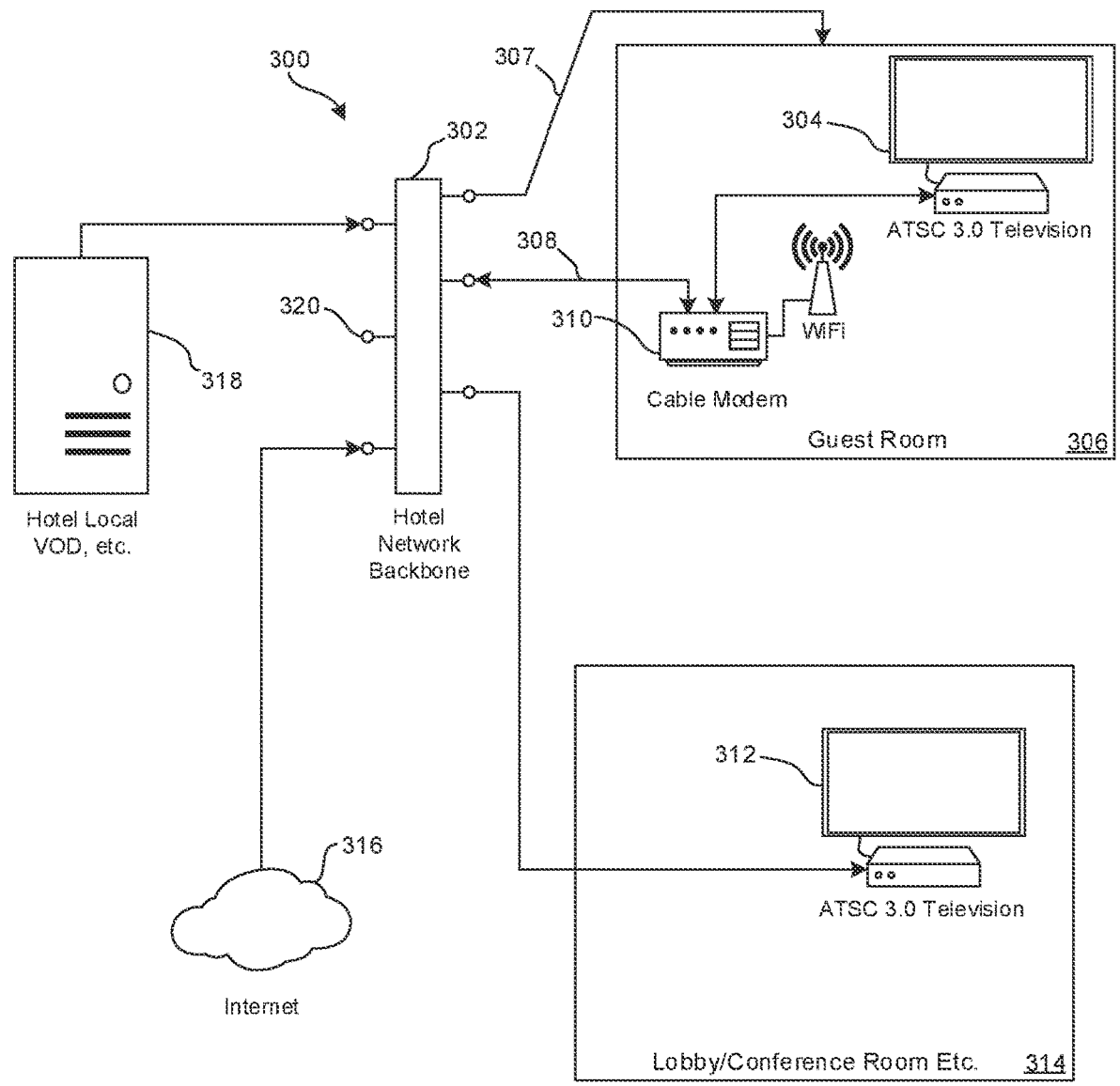
FIG. 3 illustrates an example hospitality establishment TV system, showing only a single room for clarity.

FIG. 3 illustrates a system 300 with components that may have some or all of the components and techniques described above. A hospitality establishment (such as a hotel) network backbone 302, which may have one or more attached servers with associated processors (implemented, if desired, by one or more personal computers or other appropriate computer), can broadcast and/or receive audio video (AV) content to or by one or more ATSC 3.0 televisions (TVs) 304 in respective spaces 306 of the establishment via wireless broadcast links 307, which may be implemented as Wi-Fi links or other link such as low power links or other ATSC 3.0-compatible link. In addition, or alternatively, the backbone 302 may send AV content to the TV 304 over a wired and/or wireless computer link 308 via an appropriate modem 310 such as a cable modem. For interactivity, the TV's existing network (e.g., Ethernet) connection can provide a return channel back to the backbone 302 with the existing internet connection. Examples of network links include 802.3 Ethernet and 802.11 Wi-Fi or other appropriate link.

In any case, note that the TVs in FIG. 3 need only to connect to a radiofrequency (RF) link with their respective ATSC 3.0 tuners to watch information in digital signs.

Also, the backbone 302 may send AV content to one or more public TVs 312 in public spaces 314 of the hospitality establishment such as a hotel lobby or hotel conference room. Thus, present techniques may be used for a kiosk or information displays in a hotel other than guest rooms, or in other venues such as airports or other venues. Leveraging present techniques for such purposes (kiosks, flight information displays, conference announcements, etc.) result in lower cost, easier development using widely available tools, and inventory savings (no need to acquire several different sorts of devices).

The AV content may be received by the backbone 302 over the Internet 316, a local repository 318 of video-on-demand (VOD) streams, or a broadcast, satellite, or cable input 320.

Figure 4:
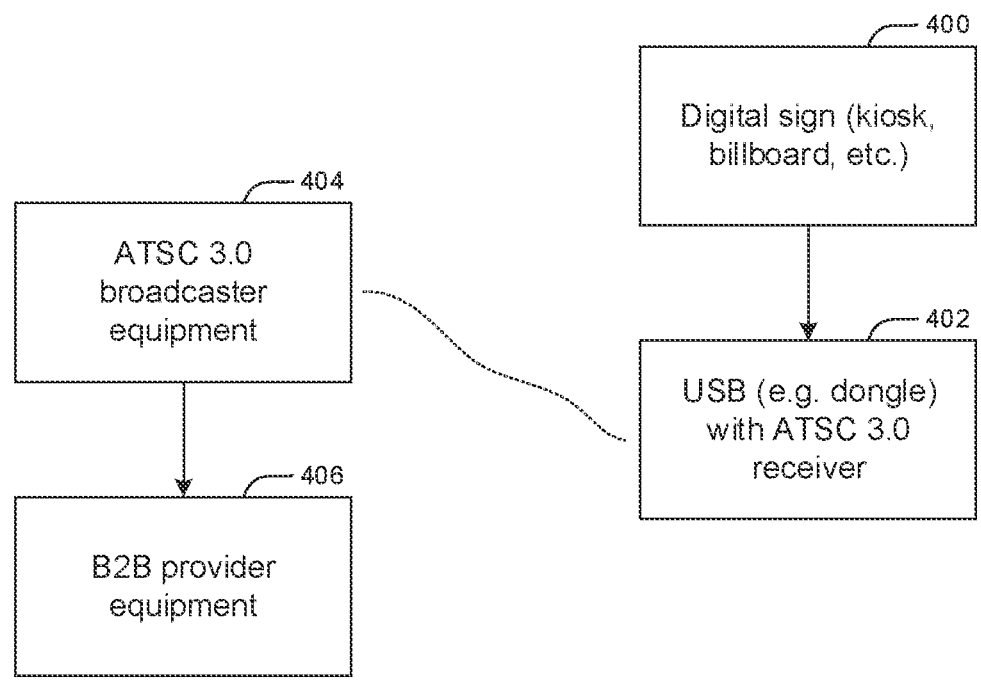
FIG. 4 is a block diagram of a first example system.

With the above in mind and referring now to FIG. 4, any of the displays described herein may be used to implement digital signage 400 including billboards (8K resolution pictures) via a browser program (typically limited to 1920× 1080 jpegs) or high resolution picture rendering application, kiosks including touch screen displays using a HTML5 application APP, with potentially small 1920×1080 display graphics, small screens including menus using personal tablets, self-navigation, road signs (interstate alert messages), taxi advertisements, and public advertisements in general (trucks with large screens). The digital signage may be adapted with one or more digital TV (e.g., ATSC 3.0) receivers 402 that may be embodied in a universal serial bus (USB) package such as a USB dongle to receive wireless signaling or embodied directly with NEXTGEN TV ready device and content from one or more digital TV (e.g., ATSC 3.0) broadcaster equipment 404 as sourced from one or more business-to-business provider equipment 406, which equipment may include appropriate receivers, transmitters, and processors as divulged elsewhere herein.

Figure 5:
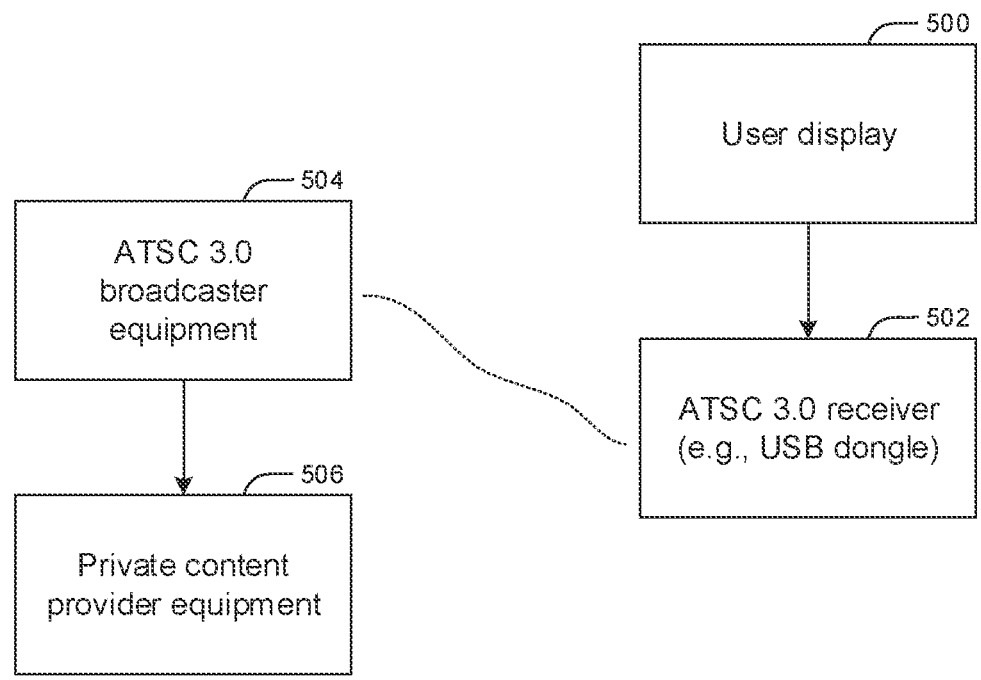
FIG. 5 is a block diagram of a second example system.

FIG. 5 illustrates that any of the displays described herein may be used to implement digital signage 400 including consumer displays (TV, Tablet, phone, refrigerator, microwave), food menu items for takeout, list of grocery items currently on sale, etc. Presentation may pop up when things expire, or become available from a restaurant, and could be updated daily/hourly. The digital signage may be adapted with one or more digital TV (e.g., ATSC 3.0) receivers 502 that may be embodied in a universal serial bus (USB) package such as a USB dongle to receive wireless signaling or embodied directly with NEXTGEN TV ready device and content from one or more digital TV (e.g., ATSC 3.0) broadcaster equipment 504 as sourced from one or more private content provider equipment 506, which equipment may include appropriate receivers, transmitters, and processors as divulged elsewhere herein.

FIG. 6 illustrates a first example signaling method that may be used, e.g., by any of the broadcaster equipment 404/504 in FIGS. 4 and 5 to send digital signage content (ATSC 3.0 audio, still or video visual content, etc.) to the digital signs 400/500. ATSC A/331 is incorporated herein by reference, and in section 6 provides for a low leveling signaling (LLS) with a "case FF" field, which essentially indicates a user-defined capability that is otherwise undefined, hence present principles, including a private usage table (PUT) 600 as shown in FIG. 6, to exploit this capability. The formal syntax provided for in ATSC A/331 is LLS_table_id=0xFF, with user service bundle description (USBD) and Service-based Transport Session Instance Description (S-TSID) maintained and an extensible markup language (XML) document defined with namespace for @deviceType indicating a type of device that the display is, which can include billboard, kiosk, small screen, other display type.

An example Private Usage Table (PUT) is shown in FIG. 6 and may include some or all of the indicated data elements, presented as fields in the example shown. The syntax is described below.

PUT—Root element 601 of the PUT.

@UserDefinedSubtype 602—This string may have the value "PUT", identifying this LLS UserDefined table is a PUT.

@bsid 604—This white-space delineated list of one or more 16-bit unsigned integers may identify the Broadcast Stream ID(s) of the original emission signal(s). The value of each @bsid may be the same as the value signaled in L1D_bsid in L1-Detail Signaling in the physical layer (see A/322). In the case that the Service is delivered via channel bonding at the physical layer, the list may include the BSID value of each RF emission involved in the bonding.

PUTCapabilities 606—Required capabilities for decoding and meaningfully presenting the content for all the Services in this SLT instance. The syntax and semantics of the PUTCapabilities element may be the same as the sa:Capabilities element specified under the Content fragment of the ATSC 3.0 Service Announcement specification A/332.

Service 608—Service information.

@serviceId 610—16-bit integer that may uniquely identify this Service within the scope of this Broadcast area.

@globalServiceID 612—The globally unique uniform resource identifier (URI) value that may represent the identity of this ATSC 3.0 Service. This attribute provides the linkage to, and its value may be identical to that of the Service@globalServiceID attribute in the A/332 electronic service guide (ESG) for this Service. This attribute may be present for private use Services.

@putSvcSeqNum 614—This integer number may indicate the sequence number of the PUT Service information with Service ID equal to the serviceId attribute above. putSveSeqNum value may start at 0 for each Service and may be incremented by 1 every time any attribute or child of this Service element is changed. If no attribute or child element values are changed compared to the previous Service element with a particular value of serviceId then putSvcSeqNum may not be incremented. The putSvcSeqNum field may wrap back to 0 after reaching the maximum value.

@putStartTime 616—This required xs:dateTime attribute may specify the start time of the associated Service.

@putStopTime 618—This required xs:dateTime attribute may specify the end time of the associated Service. The @endTime attribute should indicate a date/time in the future relative to the time this instance of the PUT is inserted into the signal. (Time-shifted content, e.g., played back from a digital video recorder (DVR), may have an @endTime attribute that is in the past.)

@protected 620—When set to "true" indicates that one or more components necessary for meaningful presentation is protected. When set to "false", indicates that no components necessary for meaningful presentation of the Service are protected. Default value is "false".

@majorChannelNo 622—An integer number in the range 1 to 999 that may represent the "major" channel number of the Service. Assignment of major channel numbers may follow the guidelines given in A/65 Annex B in order to guarantee that the two-part channel number combinations used by a licensee of an ATSC 3.0 broadcast will be different from those used by any other such licensee with an overlapping DTV Service Area. Note that an ATSC 3.0 broadcast Service may use the same two-part channel number combination in use in an ATSC A/53 broadcast within the DTV Service Area, given equivalent programming between the two. Specification of a @majorChannelNo is not required for Services that are not intended to be selected directly by viewers, such as an ESG data delivery Service or an emergency alert system (EAS) rich media delivery Service.

@minorChannelNo 624—An integer number in the range 1 to 999 that may represent the "minor" channel number of the Service. This number is not required for Services that are not intended to be selected directly by viewers, such as an ESG data delivery Service or an EAS rich media delivery Service.

@deviceType 626—8-bit integer that indicates the category of this Service. The value may be coded according to Table 1.

TABLE

Error! No text of specified style in document..1
Code Values for PUT.Service@deviceType

| deviceType | Meaning |
| --- | --- |
| 0 | ATSC Reserved |
| 1 | Billboards |
| 2 | Kiosk |
| 3 | Small Screen |
| 4 | Road sign |
| 5 | Mobile Advertisements |
| 6 | Audio Public Announcements |
| 7 | Consumer displays |
| Other values | ATSC Reserved |

@deviceId 628—8-bit integer that indicates the device identification number. This enables addressing multiple device types across different locations.

@shortServiceName 630—Short name of the Service (up to 7 characters).

@hidden 632—Boolean value that when present and set to "true" may indicate that the Service is intended for testing or proprietary use, and is not intended to be selected by ordinary TV receivers. The default value may be "false" when not present.

@drmSystemID 634—This xs:anyURI attribute may be present when @serviceCategory is "6" (digital rights management (DRM) Data Service). This element carries long term key license information relative to a specific DRM system. This attribute may be set to a uniform resource name (URN) identifying the DRM system ID associated with this DRM Data Service. The URN may contain a universal unique identifier (UUID) formatted the same as the value of the @schemeIdUri used for the DASH MPD ContentProtection Descriptor, per Section 7.6 of DASH-IF. The "urn:uuid:" prefix may be included. More than one DRM Data Service may appear in a given PUT. The same value in the @drmSystemID attribute may be included in multiple instances of a Service identified as a DRM Data Service.

SvcCapabilities 636—Required capabilities for decoding and meaningfully presenting the content for the Service with Service ID equal to the @serviceId attribute above. The syntax and semantics of the SvcCapabilities element may be the same as the sa:Capabilities element specified under the Content fragment of the ATSC 3.0 Service Announcement specification A/332.

BroadcastSvcSignaling 638—This element and its attributes provides broadcast signaling related information.

@putProtocol 640—An attribute indicating the type of delivery protocol of Service Layer Signaling used by this Service, coded according to Table 2.

TABLE

Error! No text of specified style in document..2 Code Values for PUT.Service.BroadcastSvcSignaling@putProtocol

| putProtocol | Meaning |
| --- | --- |
| 0 | ATSC Reserved |
| 1 | ROUTE |
| 2 | MMTP |
| other values | ATSC Reserved |

@putMajorProtocolVersion 642—Major version number of the protocol used to deliver the Private Usage data for this Service. Default value is 1.

@putMinorProtocolVersion 644—Minor version number of the protocol used to deliver the Private Usage data for this Service. Default value is 0.

@putDestinationIpAddress 646—A string containing the dotted-IPv4 destination address of the packets carrying Private Usage data for this Service. The syntax may be as defined in RFC 3986 Section 3.2.2.

@putDestinationUdpPort 648—Port number of the packets carrying Private Usage data for this Service.

@putSourceIpAddress 650—A string containing the dotted-IPv4 source address of the packets carrying Private Usage data for this Service. The syntax may be as defined in RFC 3986 Section 3.2.2. This attribute may be present when the value of @putProtocol is 1.

Figure 7:
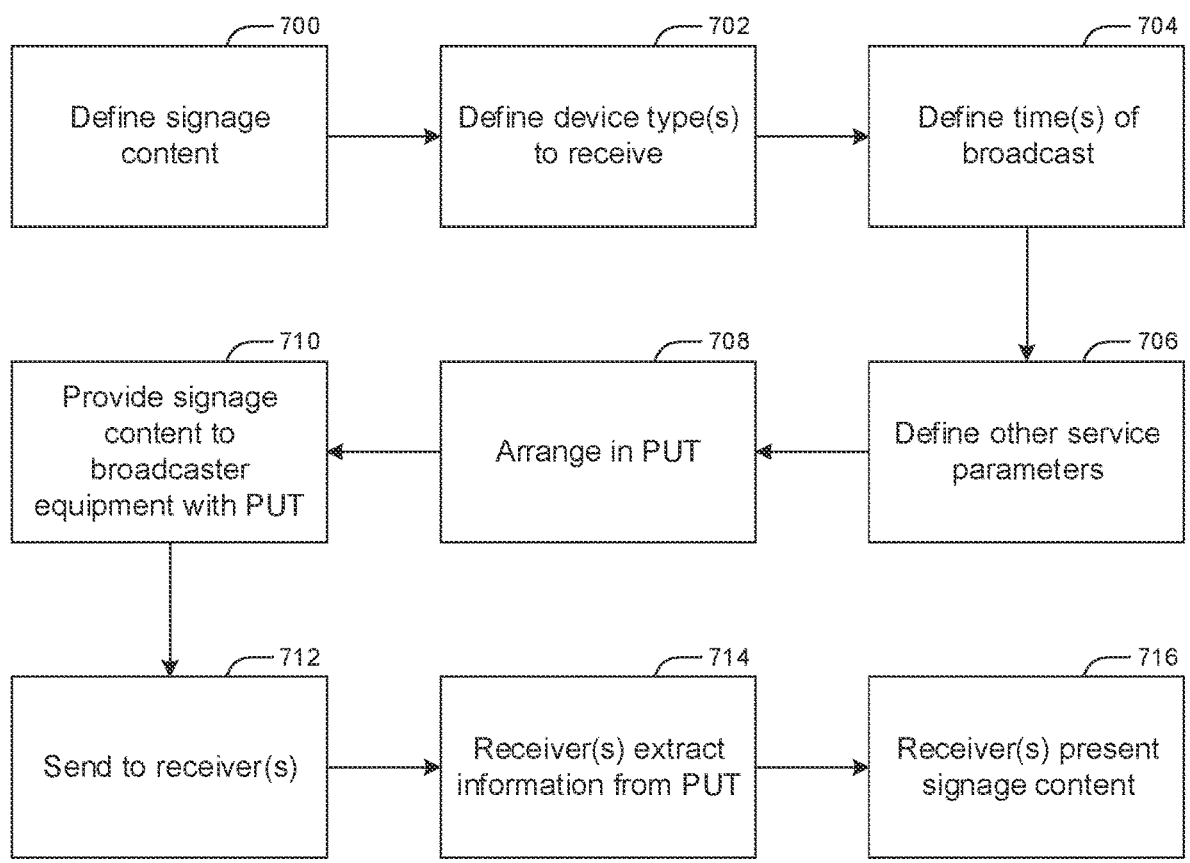
FIG. 7 illustrates example logic in example flow chart format.

FIG. 7 illustrates example logic attendant to FIG. 6. Commencing at block 700, the desired content for the digital sign is defined/created, in a DASH stream for example. At block 702 the types of device(s) and if desired identifications of the devices intended to display the signage information from block 700 are defined, along with the desired times of presentation to establish the times of broadcast at block 704.

Block 706 indicates that the additional service parameters for the PUT of FIG. 6 are defined and then the information from blocks 702-708 are arranged in a PUT. The content from block 700 and accompanying PUT are provided to the broadcaster equipment at block 710 and transmitted at the indicated broadcast time(s) at block 712 to the indicated receiver(s). Note that the PUT can accompany the TV service (content) or have a dedicated physical layer pipe (PLP) where any type of private data can be isolated from other multicast streams with a different Quality of Service (QOS). The receiver(s) extract the information from the PUT at block 714 and present the signage content from block 700 at block 716 on their respective displays.

Other signaling methods that may be used include service list tables (SLT) @serviceCategory=1 "Linear A/V Service" with @hidden="true", carousel picture files only, no audio. Or, SLT @serviceCategory=3 "App-based Service" may be used with @hidden="true", accompanied by an HTML5 application for digital signage. Yet again, a HTML entry pages location description (HELD) message may be sent with AppContextId, with non-real time (NRT) files of pictures being sent for that application. Yet another signaling method that may be used can be a new @serviceCategory 7="Video Only Service", with an extended file delivery table (EFDT) that indicates the files for pictures.

The methods described herein may be implemented as software instructions executed by a processor, suitably configured application specific integrated circuits (ASIC) or field programmable gate array (FPGA) modules, or other manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

It will be appreciated that whilst present principals have been described with reference to some example embodiments, these are not intended to be limiting, and that various alternative arrangements may be used to implement the subject matter claimed herein.

What is claimed is:

1. A digital television transmitter assembly comprising:
    at least one processor programmed with instructions to:
    send to at least one display information to be presented using at least one digital television signaling to cause the display to present content according to the signaling, the signaling comprising:
    at least one private usage table (PUT) comprising:
    at least one data element identifying at least one broadcast stream;
    at least one data element defining capabilities for decoding and presenting the content;
    at least one data element identifying a service associated with the content;
    at least one data element identifying a start time of the service;
    at least one data element identifying an end time of the service;
    at least one data element identifying a channel number of the service;

at least one data element identifying an identification number of at least one receiver for presenting the content;

at least one field identifying capabilities for decoding and presenting the content; and at least one data element identifying a delivery protocol associated with the service.

2. The digital television transmitter assembly of claim 1, wherein the digital television signaling comprises advanced television systems committee (ATSC) 3.0 signaling.

3. The digital television transmitter assembly of claim 1, wherein the signaling comprises a low level signaling (LLS)_table_id=0xFF, "User-defined usage" with user service bundle description (USBD) and Service-based Transport Session Instance Description (S-TSID) maintained and an extensible markup language (XML) document defined with namespace for @deviceType indicating a type of device that the display is.

4. A digital television receiver assembly comprising:

at least one display for presenting digital signage; and at least one processor configured with instructions for controlling the display to present the digital information in accordance with at least one private usage table (PUT), wherein the PUT comprises:

at least one data element identifying at least one broadcast stream;

at least one data element defining capabilities for decoding and presenting the display information;

at least one data element identifying a service associated with the digital information;

at least one data element identifying a start time of the service;

at least one data element identifying an end time of the service;

at least one data element identifying a channel number of the service;

at least one data element identifying an identification number of at least one receiver for presenting the digital information;

at least one field identifying capabilities for decoding and presenting the digital information; and at least one data element identifying a delivery protocol associated with the service.

5. The digital television receiver assembly of claim 4, wherein the PUT is indicated by a low level signaling (LLS)_table_id=0xFF.

6. The digital television receiver assembly of claim 4, comprising at least one universal serial bus (USB) dongle comprising an advanced television systems committee (ATSC) 3.0 receiver.

7. The digital television receiver assembly of claim 6, wherein USB data storage is implemented in a dongle.

8. The digital television receiver assembly of claim 4, wherein the display comprises a consumer display.

9. The digital television receiver assembly of claim 4, wherein the display comprises a public display.

10. A method comprising:

receiving digital television signaling comprising at least one private usage table (PUT); and presenting digital sign information in a time period defined by the PUT and in accordance with signaling parameters in the PUT and according to at least one data element in the PUT identifying an identification number of at least one receiver for presenting the digital sign information.

11. The method of claim 10, comprising:

presenting the digital sign information according to at least one data element in the PUT identifying a service associated with the digital sign information.

12. The method of claim 10, comprising:

presenting the digital sign information according to at least one data element in the PUT identifying a channel number of the service.

13. A method comprising:

receiving digital television signaling comprising at least one private usage table (PUT); and presenting digital information in a time period defined by the PUT and in accordance with signaling parameters in the PUT comprising at least one data element in the PUT identifying capabilities for decoding and presenting the digital information.

* * * * *